Patented Mar. 17, 1936

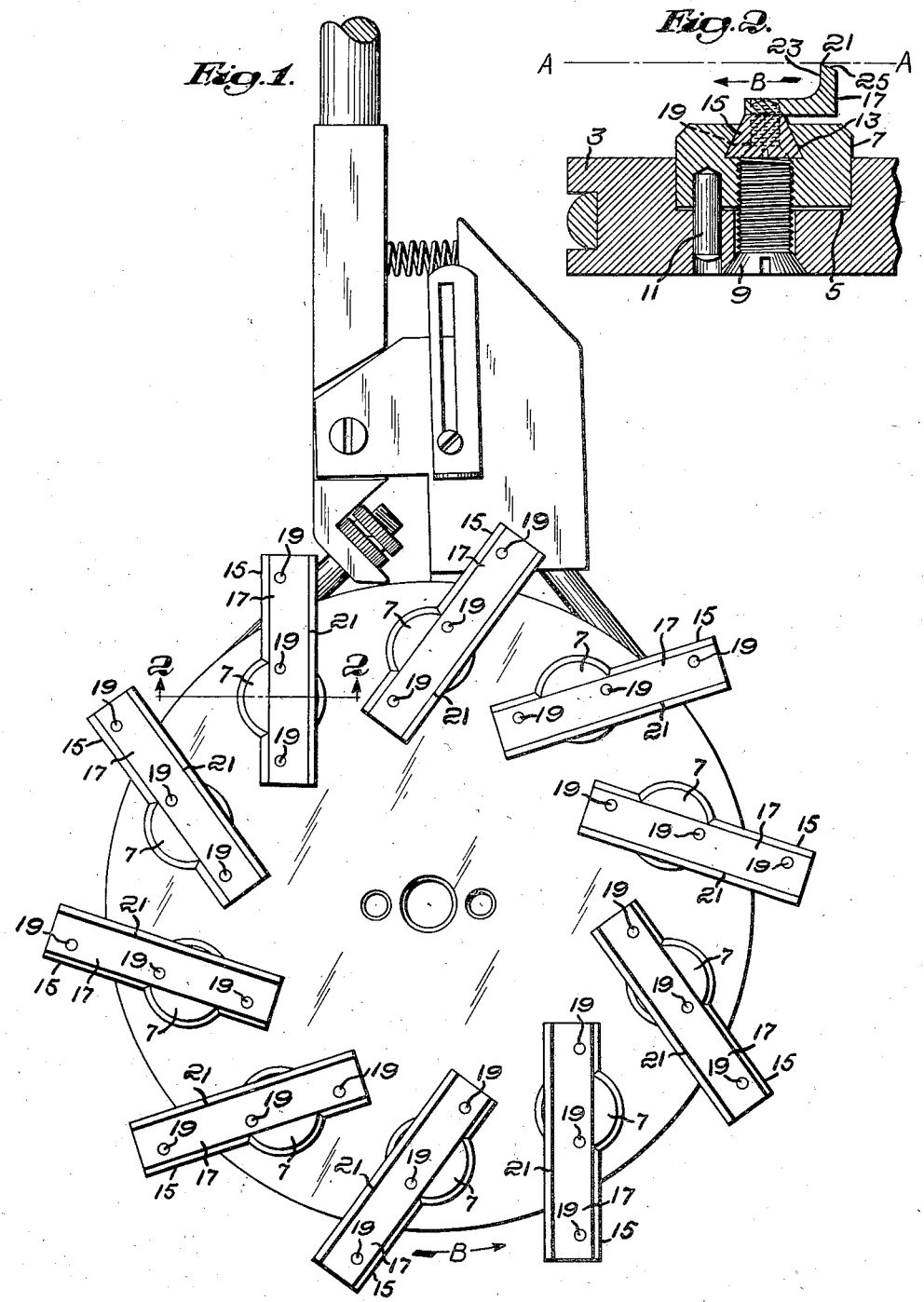

2,034,277

UNITED STATES PATENT OFFICE 2,034,277

ROTARY CUTTING TOOL

Hugh M. Albee, Orange, Mass., assignor to The Leavitt Machine Company, Orange, Mass., a corporation of Massachusetts Application October 10, 1934, Serial No. 747,704

3 Claims. (Cl. 29—105)

This invention relates to rotary cutting tools of the class in which the cutting is done in a plane perpendicular to the axis of rotation of the tool, and in which the tool is urged lengthwise of said axis toward the work during the cutting operation. More specifically, the tool in the present example is intended for use in reseating gate valves, i. e., its purpose is to reface the seats when they are worn, and its general characteristics and mode of operation are like those of the rotary cutter which is the subject matter of Patent No. 1,851,613 issued to The Leavitt Machine Company as my assignee.

The present invention deals with a tool of this type provided with cutters of novel and improved characteristics which do not merely scrape the valve seat but actually cut it, and the form of the cutters and their mounting on the rotary cutter head are such that the cutters can spring and their cutting edges can yield rearwardly with relation to the cutting plane, thereby preventing the tearing of the valve seat which sometimes characterizes the action of rigid cutters heretofore employed, particularly with some kinds of metal used in valve seats.

The invention will best be understood by reference to the following description when taken in connection with the accompanying drawing of one specific embodiment thereof, while its scope will be pointed out more particularly in the appended claims:

In the drawing:

Fig. 1 is a front elevation of a rotary valve seat refacing tool embodying the invention; and Fig. 2 is a sectional view on an enlarged scale on line 2—2 of Fig. 1.

Referring to the drawing and to the embodiment of the invention illustrated therein by way of example, there is shown a rotary cutting tool comprising a cutter head in the nature of a disk 3 counterbored at intervals to provide recesses 5 which receive studs 7 conveniently secured in place as by flat-headed screws 9 threaded into the studs, rotation of the studs in the recesses being prevented as by dowel pins 11.

Each stud is provided with a guideway 13 for the mounting of a cutter which in the present example comprises a bar 15 and a cutter blade 17 conveniently secured together as by a plurality of flat-headed screws 19 extending from the rear face of the bar into the blade and threaded into the latter, although the cutter might be made as one piece instead of two separate pieces secured together as shown. The two-piece construction herein shown by way of example is preferred, however, because the blades, being separate, can be removed and replaced by others in case of breakage or when the blade, after many resharpenings, requires replacement.

Each cutter has a cutting edge 21, and these edges (see Fig. 1) in the present example are oblique to radial lines passing through the center of rotation of the cutter head. Considered with reference to the cutting plane A—A (see Fig. 2) and the direction of rotation indicated by the arrow B, the cutter has a front face 23 generally perpendicular to the plane A—A, and it has an angular clearance face 25 rearwardly of the front face.

As already indicated, the characteristic of the cutter is such that it can spring and its cutting edge can yield rearwardly lengthwise of the axis of rotation, thereby preventing the tearing of the metal of the valve seat. This is conveniently accomplished in the present example by making the blade 17 generally L-shaped in cross-section and sufficiently thin to enable it to yield between the cutting edge and the point of attachment to the supporting bar 15, that is to say, a large part of the blade overhangs its support to afford a slight degree of flexibility to enable the cutting edge to recede when the resistance to the cutting action would otherwise cause the cutting edge to dig into the work, but instead, in this case, the yielding of the cutting edge momentarily relieves the pressure. This springing action in the form shown is partly in each limb of the L-shaped cross-section, although it is principally in the longer limb, i. e., the one which is secured to the supporting base.

In the use of the tool, the valve gate is removed, the tool is lowered into place against the valve seat, and it is urged against the latter by some such mechanism as that which is disclosed in Patent No. 1,227,511. The rotation of the cutter head is accomplished by appropriate mechanism such as that disclosed in Patent No. 1,851,- 613, by means of which a step by step rotation of the cutter head is had. It is deemed unnecessary further to describe the mode of operation or to illustrate any of those auxiliary parts which enter into the operation of the cutting tool, as they are well understood, and, moreover, may be of various constructions.

Having thus described one embodiment of the invention, but without limiting myself thereto, what I claim and desire by Letters Patent to secure is:

1. In a rotary cutting tool of the class in which the cutting is done in a plane perpendicular to the axis of rotation of the tool and in which the tool is urged lengthwise of said axis toward the work during the cutting operation, the combination of a rotatable cutter head, and a series of cutters mounted on said head and having cutting edges in a plane perpendicular to the axis of rotation of said head, each cutter having a portion supported by said head and another portion which overhangs the point of support in a direction transverse to said axis and is provided with a cutting edge, the overhanging portion being in the nature of a spring which is resiliently yieldable in the general direction of said axis to enable said cutting edge to recede from the cutting plane.

2. In a rotary cutting tool of the class in which the cutting is done in a plane perpendicular to the axis of rotation of the tool and in which the tool is urged lengthwise of said axis toward the work during the cutting operation, the combination of a rotatable cutter head, and a series of cutters mounted on said head and having cutting edges in a plane perpendicular to the axis of rotation of said head, each cutter comprising a supporting bar, a cutter blade, and means to secure said blade to said bar, said blade having a cutting edge offset from said bar, said blade having a spring portion between said edge and said bar, which is resiliently yieldable toward said head.

3. In a rotary cutting tool of the class in which the cutting is done in a plane perpendicular to the axis of rotation of the tool and in which the tool is urged lengthwise of said axis toward the work during the cutting operation, the combination of a rotatable cutter head, and a series of cutters mounted on said head and having cutting edges in a plane perpendicular to the axis of rotation of said head, each cutter having a cutting edge which is offset from the point of support of said cutter and having, between said edge and said point of support, a spring portion enabling said edge to yield toward said head.

HUGH M. ALBEE.